Feb. 6, 1940.   H. W. ALDEN   2,189,695
STEERING-DRIVE WHEEL ASSEMBLY
Filed June 18, 1938
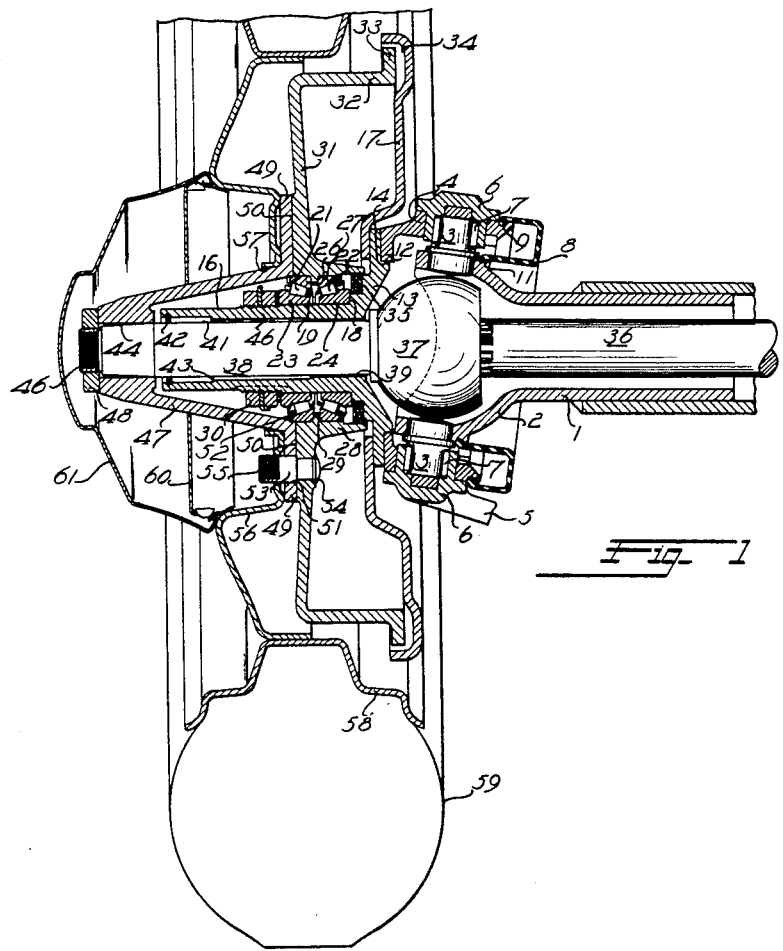
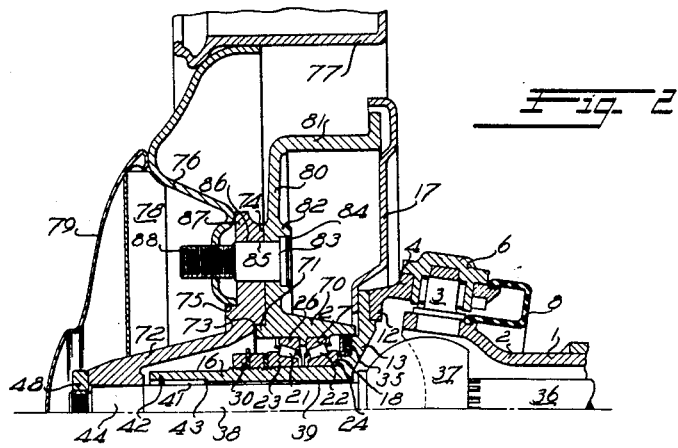
Inventor
*Herbert W. Alden*
By *Strauch & Hoffman*
Attorneys Patented Feb. 6, 1940

2,189,695

UNITED STATES PATENT OFFICE 2,189,695

STEERING-DRIVE WHEEL ASSEMBLY

Herbert W. Alden, Detroit, Mich., assignor to The Timken-Detroit Axle Company, Detroit, Mich., a corporation of Ohio Application June 18, 1938, Serial No. 214,592

13 Claims. (Cl. 180—43)

This invention relates to steering-drive axles and is more particularly concerned with improvements in wheel constructions and wheel mounting arrangements for dirigible driven wheels of axles of this particular type.

Devices of this general kind are well known in the art and, in general, consist of an axle member having pivoted at each of its outer ends a wheel spindle element. Mounted on these spindles are wheel members made up of a plurality of parts including, a hub forming member, a wheel portion, and a brake drum, see for example the wheel mounting shown in Figure 1 of the United States patent to Alden No. 2,075,563, issued on March 30, 1937. A stub axle shaft is secured at one end, by means of a driving flange, to each of the wheels and, at their other ends, these stub shafts or axles are operatively connected, by means of universal joints, to driving axles extending from a differential mechanism housed within the axle. Suitable steering devices are provided for swinging the spindles, together with their wheels, to effect steering.

The wheel supporting spindles are of considerable length in order to provide seats for two sets of spaced wheel bearings which cooperate with a wheel hub portion of co-extensive lateral dimension. The spacing of these bearings is necessary in order to give the requisite lateral stability to the mounting as well as to reduce the bearing loads, particularly those resulting from lateral thrust forces acting on the wheel and tending to tilt the wheel on its bearings.

Wheel mountings of this character are quite expensive to manufacture, due principally to the numerous parts required in the wheel assembly itself as well as to the necessity for providing two separate bearing elements in each wheel. Also, the rather long hub portion which must be formed on the wheel hub, to cooperate with these spaced bearings, involves additional cost.

I have found that by forming the wheel hub portion and the brake drum element in one piece, thus eliminating one of the several parts of the wheel assembly, a considerable economy in the manufacturing costs of the wheel assembly can be realized. I have also discovered that by journaling the stub-axle shaft within the spindle, the hub portion can be materially shortened, as to its lateral extent, and the two spaced wheel bearings, previously required, can be brought close together so as to form, in effect, a single bearing assembly, thus further lessening the cost of the hub portion. Yet, at the same time, the stability of the wheel mounting as a whole may be materially increased through the additional support provided by the stub axle. Due to this increased stability the main wheel bearing itself can now be of a smaller size and consequently less expensive. Accordingly, not only is it possible to considerably reduce the cost of production but also the serviceability and durability of the wheel mounting may be much improved. Furthermore, a more compact wheel assembly may be obtained without in any way lessening its strength.

Therefore, a primary object of my invention is to provide an improved wheel mounting for steering driving axles of the type herein discussed, in which the wheel assembly is formed of a very few, and easily fabricated, parts and is so stabilized against wheel tilting loads as to make it possible to arrange the wheel bearings very close together, as a single unit, within a relatively short hub.

It is also an object of my invention to provide an improved wheel assembly of the type described in which the wheel hub is of minimum lateral extent and is formed integrally with another part of the wheel assembly.

More specifically it is an object of my invention to provide an improved wheel assembly or steering driving axle in which the brake drum and wheel hub portion of the wheel assembly are formed as one piece thereby decreasing the number of parts involved in the wheel assembly.

A still further object of my invention is to provide an improved steering drive axle in which the stub drive axle is journaled within the wheel spindle and connected to the wheel so as to provide additional support for the wheel, thus relieving the main wheel bearing of considerable of the lateral and thrust loads acting on the wheel.

Another object of my invention is to provide an improved steering-drive axle in which the stub drive axle is rigidly secured to the wheel assembly to provide a drive connection and also is journaled within the spindle element at a point spaced considerably from the main wheel bearing so that the drive axle supports the wheel and thereby relieves the main wheel bearing of considerable thrust and lateral load.

It is also an object of this invention to provide an improved steering drive axle in which the stub axle is connected to the wheel bearing by means of a driving flange which is readily removable from the drive axle and wheel assembly to afford access to the inside of the spindle element for the purpose of adjusting the main wheel bearing.

The foregoing and other ancillary objects will become apparent from a study of the following detailed description of the preferred embodiment of my invention when considered in connection with the appended claims and accompanying drawing wherein:

Figure 1 is a vertical sectional view through a steering drive wheel mounting, embodying my invention; and Figure 2 is a sectional view of a part of a slightly modified form of steering-drive wheel mounting.

Referring to Figure 1, the numeral 1 designates an outer end of an axle housing which is enlarged at 2 to form a spherical end portion. Trunnion elements 3 are press-fitted into end portion 2 and a housing member 4 is pivoted on trunnions 3 by means of bearing caps 6 and bearings 7. One of caps 6 is provided with a steering arm 5 as shown. A flexible sealing element 8, formed of rubber, leather or other similar material, is secured in the grooves 9 and 11 in the housing 4 and axle end 2, respectively, so as to close the space formed by the housing 4 from the entrance of dust, dirt or other extraneous material.

Housing 4 is provided with radial flanged portion 12, mounted on spindle element 13, within a shouldered portion 14 thereof. Spindle element 13 is extended, as shown at 16, and brake supporting plate 17 is secured to spindle element 13 on the opposite side thereof from the flange 12 of the housing 4. These three elements are held together by means of bolts, not shown.

Spindle element 13 is shouldered at 18 and provided with smooth cylindrical surface 19 on which are mounted roller bearings 21 and 22, having inner races 23 and 24 and outer races 26 and 27. Inner races 23 and 24 are fitted snugly over cylindrical surface 19 and race 24 abuts against shoulder 18. Outer races 26 and 27 abut, in their inner edges, against an annular projection 29, provided on hub portion 28; the whole bearing assembly being held in adjusted position by a lock nut assembly 30. Hub portion 28 is extended to form a radial flange 31 which, at its outer end, carries a cylindrical flange 32, providing a brake drum portion adapted to provide a braking surface for a brake element, not shown, carried by the brake supporting plate member 17. At its outer edge flange 32 has a second radial flange 33 received in recess 34 formed in plate 17. This radial flange and recess cooperate to form a means for preventing the entrance of dust or dirt into the braking chamber. A sealing element 35 is arranged between hub 28 and spindle 13 to prevent the leakage of lubricant into the braking chamber.

A drive axle 36, extending from the differential mechanism of the axle, not shown, is associated with a universal joint 37. Extending from universal joint 37 is a stub drive axle 38, which projects considerably beyond the outer end of the spindle element 16. Stub axle 38 is journaled adjacent the universal joint 37 on a bronze bushing 39, pressed within spindle element 13, and, at its outer end, by an anti-friction bearing of the needle-roller type 41 carried by the outer end of the spindle portion 16. A shoulder 43 on spindle element 16 and snap ring 42 provide means for preventing undue axial displacement of rollers 41.

The outer end of stub axle 38 is tapered at 44 and has a threaded portion 46, beyond the tapered portion. A driving flange element 47 is drawn onto the tapered end 44 of stub axle 38 by means of a locking nut 48 and a key, not shown, is also provided to insure a positive drive connection between stub axle 38 and the driving flange 47. A radially extended portion 49 of driving flange 47 abuts against a flat radial surface 50 of hub element 28 and its flange 31. Flange 49 is apertured at 51 and hub 28 provided with a circular series of studs 53, extending through these apertures, and also through the flange element 31 of the wheel hub portion. Studs 53 are riveted to hub 28, as at 54, so as to be held fixedly thereto. Flange 47 is formed with a piloting recess 52, snugly engaging bearing race 23, which projects slightly beyond surface 50, thus centering flange 47 with respect to hub 28. The outer ends of studs 53 are threaded at 55 as shown. A wheel disc member 56 is fitted on over the threaded portion of these studs 53 and nuts, not shown, are utilized to hold these three elements, i. e., 56, 49 and 31 in assembled relation in a manner which will be readily understood. Portion 57 of element 47 provides an annular shoulder for receiving member 56.

A conventional rim 58 and tire 59 are carried on the outer periphery of wheel element 56 and a clamping member 60 is welded to the element 56 to receive a suitable hub cap 61, adapted to be snapped thereover in a conventional manner.

The operation of this device will be readily understood from an inspection of the drawing and is briefly as follows:

Power is supplied through drive axle 36, universal joint 37 and stub axle 38, driving flange 47, to the wheel hub portion 31, so that wheel 56 is rotated on spindle portion 16. The whole wheel assembly is pivoted above the axes of trunnions 3—3, which extend through the center line of universal joint 37; thus, the wheel may be pivoted while power is still being supplied thereto, in the usual manner of driving steering axles of this type.

It will be observed that the driving flange 47 is rigidly bolted to the hub portion 28 and also securely fixed to the end of stub axle 38. Thus, since the stub axle itself is journaled on the bearings 41, as well as on the bearings 39, lateral or tilting movement of the stub axle 38, with respect to spindle 16, is prevented, and, accordingly, the driving flange 47, which is secured rigidly to the hub portion 28, will transmit lateral thrust and wheel tilting loads directly to the stub axle 38 where they are in turn supported by the aforementioned bearings. Therefore, the wheel bearings 21 and 22 are relieved of such loads.

It will also be noted that the brake drum portion 32 and wheel hub portion 28 are formed integrally and as one piece, also that the hub portion 28 is relatively narrow and that the wheel bearings 21 and 22 are closely spaced together so as to form in effect a single wheel bearing.

Accordingly, it is seen that, while a main wheel bearing assembly which is in effect a single bearing is utlized, an unusually rigid mounting of the wheel is effected, through driving flange 47 and stub axle 38, by virtue of the journaling of the stub axle within the wheel spindle element 16. Bearing 41 is spaced considerably from the center line of the bearings 21 and 22 so that a lever arm of considerable length is provided in this wheel mounting and thus the lateral and thrust loads, which tend to tilt the wheel assembly and to move the shaft 38 laterally with respect to its bearings, can be effectively resisted by the relatively inexpensive needle bearing arrangement 41 as shown, the bushing 39 being primarily used to support the inner end of stub axle 38 but also aiding in the stabilizing action. Also, the main wheel bearing, due to the fact that this lateral thrust and tilting load is removed therefrom, and its radial load thus equalized, can be of a smaller size than would otherwise be necessary.

Furthermore, by making the wheel hub 28 and the brake drum 32 as one piece, the number of parts formed in the wheel assembly has been reduced by one third and the cost of manufacture thereof correspondingly decreased. Likewise, the small lateral extent of the hub 28, sufficient for this bearing arrangement, further reduces the cost of production. It will also be seen that upon removal of the driving flange 47, which can be effected by removing the wheel assembly bolt and the locking nut 48, access to adjusting nut 30 is obtained.

Bearings 21 and 22 may be packed in grease which will fill the space between the axially elongated portion of driving flange 47 and also enter between rollers 41, to lubricate the same, some of which will reach bushing 39. Thus all of the bearings are adequately lubricated yet sealing means 35 prevents escape of the lubricant into the braking mechanism chamber while the close running fit of bushing 39 on stub axle 38 will not allow any material loss of lubricant at this point.

As the stub axle is journaled within the spindle and also rigidly connected to the wheel assembly, with the inner end of axle 36 supported by the differential side gears, a three-quarter floating axle mounting is, in effect, produced. That is, the wheel is rigidly supported independently of axle 36, so that said axle does not receive any bending stresses, yet, at the same time, the outer stub axle, which is connected to the axle 36 through universal joint 37, is journaled so as to stabilize the wheel. As has already been explained, this arrangement provides an unusually strong and stable wheel mounting with a much closer wheel bearing spacing, shorter hub and smaller wheel bearings.

Referring now to Figure 2 a slightly modified form of my invention will now be described. This wheel construction and mounting is, as will be apparent, essentially like that of Figure 1 and, for the most part, all of the constituent elements are similar to those just described. Accordingly, these identical parts are designated by the same reference characters previously used and are not further described. In this figure the hub is designated by the numeral 70 and differs from hub 28 in that it is provided with a piloting flange 71. Driving flange 72 is provided with an annular recess 73, adapted to snugly fit over flange 71. Hub 70 is a little wider than hub 28 so that bearing race 26 does not project beyond the flat surface 74 and piloting flange 71 is, accordingly, provided to insure centering of driving flange 72.

Driving flange 72 is formed with an annular shoulder 75 for supporting a wheel disc element 76, carrying rim element 77, clamping member 78 and hub cap 79. Hub 70 has a radially extending web 80 terminating, at its outer edge, in a brake drum section 81. Web 80 is thickened at 82 and headed studs 83 are secured in this thickened portion by staking at 84. Studs 83 have cylindrical portions 85, fitting in apertures 86 in a radially extending portion 87 of the driving flange 72, and threaded ends 88 extending through wheel disc element 76 are provided for clamping bolts, not shown.

This form of wheel mounting operates in exactly the same manner as that shown in Figure 1, as will be apparent. However, the modified hub construction, with its piloting flange 71, the wheel disc supporting shoulder 75 on the driving flange, and the slightly heavier stud construction, provide a stronger construction which is better suited for heavier types of axles.

It will also be observed that in the form shown in Figure 2 the diameters of hub web 80 and brake drum 81 are considerably less than web 31 and brake drum 32, of Figure 1, in order to accommodate the smaller wheel disc 76 and rim 77 which are provided for larger depth tires.

From the foregoing it will be seen that I have provided improved wheel mountings for steering drive axles in which the wheel assembly is composed of fewer parts than that required by present day wheel assemblies, thus reducing the cost of production of the wheel. The bearing mounting for the wheel has been improved by closing up the space between the main wheel bearings, hence reducing the length of hub, and by journaling the stub axle within the wheel spindle so that the driving flange and the stub axle operate to provide a support for the wheel assembly. Thus, the stability of the mounting has been improved and yet, at the same time, main wheel bearings of a smaller size, and consequently of less cost, may be used.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A steering-driving wheel assembly, comprising, an axle, a hollow spindle pivoted to said axle; a wheel assembly, including a relatively narrow hub portion; bearing means carried by the inner end of said spindle and associated with said hub portion, said bearing means alone being incapable of providing adequate lateral stability for said wheel assembly and said spindle extending outwardly beyond said hub for an appreciable distance; a drive shaft journaled in said hollow spindle at a point spaced axially from said bearing means and projecting beyond its outer end; and means for rigidly connecting said hub portion to said drive shaft, whereby said wheel assembly is supported by said bearing means and laterally stabilized by said drive shaft.

2. A steering-driving wheel assembly, comprising, an axle; a hollow spindle carried by the outer end of said axle; a wheel assembly, including a relatively narrow hub portion; bearing means for journaling said hub portion on the inner end of said spindle, said bearing means alone being incapable of providing adequate lateral stability for said wheel assembly and said spindle extending outwardly beyond said hub for an appreciable distance; a drive shaft within said spindle and having an end projecting outwardly therefrom; a driving flange rigidly connecting said hub portion to said projecting end of said drive shaft; and additional bearing means for journaling said drive shaft, said last-named bearing means being spaced axially of said spindle from said first-named bearing means, whereby tilting of said wheel assembly on said first-named bearing means is prevented by said drive shaft.

3. A steering-driving wheel assembly, comprising, an axle; a hollow spindle pivotally mounted on an outer end of said axle; a wheel assembly; said wheel assembly including a narrow hub portion surrounding said spindle adjacent its inner end; bearing means between said hub and said spindle, said bearing means alone being incapable of providing adequate lateral stability for said wheel assembly and said spindle extending outwardly beyond said hub for an appreciable distance; said hub portion having a radially extending flange thereon; a driving flange secured to said radially extending flange and having an axially directed section; a drive shaft secured at one end to said section and extending through said hollow spindle; spaced bearing means for journaling said drive shaft in said spindle, one of said last named bearing means being axially spaced from said wheel bearing means, whereby said shaft is held against movement transversely of said spindle and stabilizes said wheel assembly through said driving flange.

4. In a steering-driving wheel assembly; a pivotally mounted hollow spindle element; a relatively narrow hub portion journaled on the inner end of said spindle and having a radially extending flange extending away from said spindle; an outwardly and axially facing annular flat surface an said radial flange; wheel bearing means associated with said hub and said spindle, said bearing means alone being incapable of providing adequate lateral stability for said wheel assembly and said spindle extending outwardly beyond said hub for an appreciable distance; a drive coupling having an axially directed body and a radially extending flange; means for securing said last-named radial flange to said flat surface; a drive shaft secured to said body and projecting into said spindle element; and bearing means for supporting said drive shaft in said spindle, said bearing means being spaced axially from said wheel bearing means whereby said drive shaft stabilizes said wheel assembly.

5. A steering-driving wheel assembly, comprising, an axle; a hollow spindle pivotally mounted on said axle; a wheel assembly including a relatively narrow hub portion; anti-friction bearing means for journaling said hub adjacent the inner end of said spindle, said bearing means alone being incapable of providing adequate lateral stability for said wheel assembly and said spindle extending beyond said hub for an appreciable distance; means forming a part of said wheel assembly and extending beyond the outer end of said spindle; a drive shaft within said spindle having one end secured to said means adjacent the outer end of said spindle; a series of anti-friction rollers between said shaft and the outer end of said spindle; said anti-friction rollers being spaced axially of said spindle from said anti-friction bearing means; and other bearing means journaling the opposite end of said shaft in said spindle; whereby said shaft is held against movement radially of said spindle and braces said wheel assembly against tilting on said spindle.

6. A steering-drive wheel assembly, comprising, an axle; a hollow spindle having its inner end pivoted on an outer end of said axle; a wheel assembly including, a hub portion, a driving flange and a wheel element; a shoulder on said spindle; an inwardly projecting radial rib on said hub portion; an anti-friction bearing means having an inner race abutting said shoulder and an outer race abutting said rib; a second anti-friction bearing means having its outer race abutting the opposite side of said rib and its inner race engaged by an adjustable abutment on said spindle; said spindle extending considerably beyond said abutment within said driving flange; a drive shaft within said spindle and journaled adjacent the outer end thereof on a bearing spaced from said anti-friction bearing means; said drive shaft having an end extending beyond said spindle; and means for removably securing said driving flange to said hub portion and to said end of said drive shaft; whereby said driving flange may be removed to provide access to said adjustable abutment, and said drive shaft braces said hub on said spindle.

7. A steering-driving wheel assembly, comprising, an axle; a hollow spindle pivoted to said axle; said spindle including an axially extending cylindrical section and a radially extending flange; a brake supporting plate secured to said flange and extending radially therefrom; a shoulder on said spindle adjacent said flange; a wheel assembly including integral hub and brake drum portions joined by a radial web, said brake drum portion extending towards said plate and said hub surrounding said spindle adjacent said shoulder; a rib on the inside of said hub; an anti-friction bearing assembly having outer races straddling said rib and an inner race abutting said shoulder; a second inner race; a lock nut assembly threaded to said spindle and engaging said second inner race; a driving flange surrounding said spindle and lock nut assembly and extending beyond said spindle; a drive shaft secured to the outer end of said driving flange and extending through said spindle; bearing means, spaced outwardly of said anti-friction bearing assembly, for journaling said drive shaft in said spindle; a wheel element; and means for securing said element and said driving flange to said radial web, said means being releasable to permit removal of said driving flange for access to said lock nut assembly.

8. In a steering-drive wheel assembly; a pivotally mounted hollow spindle; an anti-friction bearing assembly including axially spaced inner and outer races mounted on said spindle adjacent its inner end; a hub portion having a rib thereon; said hub being mounted on said bearing assembly with said rib between said outer races; means on said spindle for engaging said inner races to hold said assembly against axial movement; one of said last-named means being adjustable to take up wear in said bearing assembly; a driving flange, having an axially extending cylindrical portion and a radial web; releasable means for securing said web to said hub portion and additional means for preventing relative lateral movement of said web and hub; a drive shaft connected to the outer end of said driving flange cylindrical portion and extending through said spindle, and spaced bearing means in said spindle for journaling said shaft, at least one of said spaced bearings being located outwardly from said anti-friction bearing assembly, whereby said shaft braces said hub through said driving flange.

9. In a steering-driving wheel mounting, a pivotally mounted hollow spindle; a double tapered roller bearing assembly fixed to the inner end of said spindle; a hub portion associated with bearing assembly and axially fixed with respect thereto; a piloting flange on said hub and an annular surface extending radially thereon adjacent said flange; a driving flange having an annular recess for engaging said piloting flange and a radial flange for engaging said surface; means for securing said driving flange to said hub with said radial flange engaging said surface and said recess fitting over said piloting flange; said driving flange extending beyond said spindle; a drive shaft journaled in said spindle adjacent its outer end; and means for rigidly connecting said driving flange to said shaft, whereby said hub portion is supported by said shaft as well as by said tapered roller bearing assembly.

10. In a wheel assembly, comprising, an apertured wheel element, a driving flange and a hub portion; said hub portion having a radial body, an inner axial flange and an outer axial flange surrounding said inner flange in spaced relation thereto; said inner flange providing inwardly facing bearing seats and said outer flange having a braking surface thereon; a flat annular surface on said body; a circular series of studs fixed to said body and extending outwardly from said flat surface, said studs having plain cylindrical surfaces terminating in threaded ends; said driving flange including a radial section and an axial section; holes in said radial section for fitting over said cylindrical surfaces of said studs; an annular shoulder on said driving flange for receiving said apertured wheel element; and means engaging the threaded ends of said bolts for holding said wheel element and said radial section of said driving flange in assembled relation on said hub portion.

11. In a wheel assembly, a hub, a driving flange and a wheel element; said hub portion comprising a one-piece annular element of substantially U-shaped cross section and providing an outer annular braking surface, and an inner bearing supporting section, and an interconnecting radial body; and means associated with said body for removably securing said driving flange and said wheel element to said body.

12. In a wheel assembly, a hub, a driving flange and a wheel element; said hub portion comprising a one-piece annular element of substantially U-shaped cross section and providing radially spaced concentric flanges connected by a radial web section; the outer of said flanges being adapted for use as a brake drum and the inner of said flanges accommodating a main wheel bearing; a flat surface on one side of said web, piloting means adjacent said surface for engaging a piloting recess on said driving flange; a shoulder on said driving flange for centering said wheel element; and means for securing said driving flange and wheel element to said hub and against said flat surface.

13. In a wheel assembly; a hub, a driving flange and a wheel element; said hub comprising a one-piece annular element of substantially U-shaped cross-section providing radially spaced axial flanges connected by a radial body section; bearing seats on the inside of the innermost of said radial flanges and a braking surface on the other of said radial flanges; a flat surface of considerable area on the side of said body which faces away from said flanges; a cooperating flat surface on said driving flange; and means for holding said flat surfaces in engagement to rigidly secure said driving flange to said hub, comprising, threaded studs carried by said body and passing through said driving flange, said studs also passing through said wheel element, and bolts on said studs engaging said wheel element.

HERBERT W. ALDEN.